United States Patent [19]

Orlando et al.

[11] 3,989,531
[45] Nov. 2, 1976

[54] FIRE-RETARDANT POLYMERIC COMPOSITIONS CONTAINING BROMINATED BIPHENOLS

[75] Inventors: Charles M. Orlando, Schenectady, N.Y.; Francois A. Lavallee, Willoughby, Ohio

[73] Assignee: General Electric Company, Schenectady, N.Y.

[22] Filed: Mar. 12, 1974

[21] Appl. No.: 450,364

Related U.S. Application Data

[63] Continuation-in-part of Ser. No. 169,517, Aug. 5, 1971, Pat. No. 3,929,908.

[52] U.S. Cl. .............................. 106/15 FP; 252/8.1; 260/45.95 R; 260/DIG. 24; 260/874
[51] Int. Cl.$^2$ ...................... C08K 5/13; C09D 5/18; C09K 3/28
[58] Field of Search ............................. 106/15–18; 252/8.1; 260/619, 620, 45.95, DIG. 24

[56] References Cited

UNITED STATES PATENTS

| | | | |
|---|---|---|---|
| 3,660,321 | 5/1972 | Praetzel et al. | 106/15 F P X |
| 3,748,303 | 7/1973 | Becker et al. | 260/47 XA |
| 3,796,772 | 3/1974 | Luce | 260/45.95 R X |
| 3,830,766 | 8/1974 | Praetzel et al. | 260/45.95 R X |

*Primary Examiner*—Joan E. Welcome
*Attorney, Agent, or Firm*—F. Wesley Turner; Joseph T. Cohen; Jerome C. Squillaro

[57] ABSTRACT

Bromobiphenols comprising 2,2',6,6'-tetraalkyl-3,3',5,5'-tetrabromo-1,1'-biphenols and derivatives thereof are employed as fire-retardant additives for normally flammable resins yielding fire-retardant polymeric compositions. These fire-retardant compositions are thermally stable and can be molded or formed into fire-retardant articles, such as films, sheeting, fibers, laminates, or reinforced plastics by conventional techniques.

11 Claims, No Drawings

FIRE-RETARDANT POLYMERIC COMPOSITIONS CONTAINING BROMINATED BIPHENOLS

This is a continuation-in-part of application Ser. No. 169,517, filed Aug. 5, 1971.

This invention relates to a fire-retardant polymeric composition comprising
 a. a normally flammable resin, and
 b. a fire-retardant additive selected from halogenated monomeric and polymeric organic compounds of the formula:

(I)

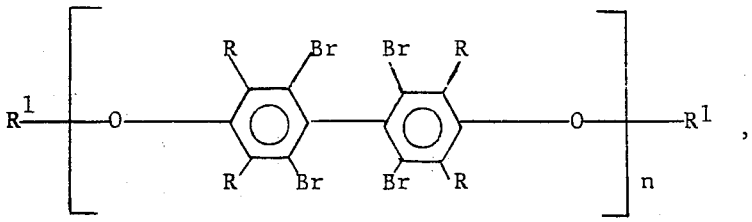

wherein each R independently is selected from primary alkyl groups, each $R^1$ is independently selected from hydrogen and organic groups, and $n$ is a positive integer of at least 1.

In our copending application, Ser. No. 169,517, filed Aug. 5, 1971, and assigned to the same assignee as the present invention, we disclose the preparation of 2,2',6,6'-tetraalkyl-3,3',5,5'-tetrabromo-1,1'-biphenol (hereinafter sometimes referred to as TATB) by reacting a 2,2',6,6'-tetraalkyl substituted diphenoquinone, and the use of the resulting tetrabrominated biphenols and derivatives thereof in the preparation of flameproof plastics.

Although halogenated biphenols and derivatives thereof, other than those of our invention, such as bisphenol-A are well-known to the art in the preparation of fire-retardant polymeric compositions, the use of TATB and derivatives thereof in the preparation of improved fire-retardant polymeric compositions (our invention) is a valuable contribution to the fire-retardant additive art since the thermal stability of TATB and derivatives thereof beneficially permits normally flammable resins to be processed at elevated temperatures into fire-retardant polymeric materials while exhibiting less polymer thermal degradation and more monomer thermal stability than has been heretofore found with other halogenated biphenols.

In accordance with this invention, we have found that fire-retardant polymeric compositions comprising (a) a normally flammable resin and (b) a fire-retardant additive selected from halogenated monomeric and polymeric organic compounds of formula I set out hereinbefore.

The normally flammable resins which are employed are any normally flammable resins which flammability characteristics are measurably reduced to some degree by any commonly accepted test method well-known to those skilled in the art. Among the more commonly employed flammable resins are such materials as acrylonitrile-butadiene-styrene resins, acetal resins, acrylic resins, alkyd resins, allyl resins, amino resins, cellulosic resins, epoxy resins, chlorinated polyether resins, fluoroplastics, polyimides, polybenzimidazoles, polybenzothiazoles, furane resins, ionomer resins, methylpentene polymers, polyamide resins, phenolic resins, polyphenylene oxide resins, polyallomer copolymers, polycarbonate resins, polyester resins, polyethylene resins, polypropylene resins, polysulfone resins, polyurethanes, silicone resins, styrene-butadiene thermoplastic elastomers, styrene polymers, parylene polymers, vinylchloride polymers, vinylidene chloride polymers, butadiene-acrylonitrile polymers, polybutadienes, natural rubber, styrene-butadiene synthetic rubber polymers, etc., and the like. All such resins, polymers, elastomers are commercially available and can be synthesized by techniques well-known to those skilled in the art or can be obtained from naturally occurring sources.

Among the preferred features of this invention are flame retardant polymeric compositions wherein the normally flammable resins comprise, primarily, ingredients selected from the group consisting of blends of polyphenylene oxides: polystyrene, especially those containing mol proportions within the range of from about 50:50 to about 35:65, respectively; polyesters, especially polymeric glycol esters of terephthalic acid and isophthalic acids, e.g. poly(ethylene terephalate) and poly(1,4-butylene terephalate); polystyrene resins, especially rubber-modified polystyrene having proportions of rubber: polystyrene within the volume range of from about 10:90 to about 40:60 e.g. high impact polystyrene; polyethylene, especially that form known as high density polyethylene which comprises normally crystalline copolymers of ethylene with olefin are from 4 to 10 carbon atoms; polypropylene, especially that form known as isotactic polypropylene, which comprises normally crystalline copolymers of propylene with ethylene or other 1-olefins of up to 10 carbon atoms; and polycarbonates, especially aromatic polycarbonates prepared from 2,2'-bis-(1,1'-dihydroxydiphenyl)propane and phosgene or bischloroformates.

The fire-retardant additive which is employed is any fire-retardant additive selected from halogenated monomeric and polymeric organic compounds corresponding to the compounds of formula I referenced and set out hereinbefore.

A presently preferred class of halogenated monomeric organic compounds comprises 2,2',6,6'-tetraalkyl-3,3',5,5'-tetrabromo-1,1'-biphenols of formula I set out hereinbefore, wherein at least one of the $R^1$ groups is selected from the radicals consisting of:
 i. organic radicals, such as (a) $R^2-$ (b) 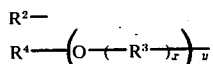

(c) 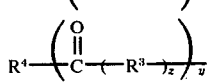

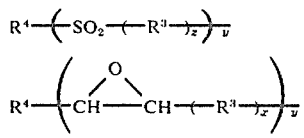

wherein $R^2$ is selected from the group consisting of hydrogen, cyano, alkyl, alkenyl, cycloalkyl, cycloalkenyl, aryl and mixtures thereof, such as alkylaryl, alkylcycloalkyl, arylalkyl, alkenylaryl, alkenylcycloalkyl, arylcycloalkenyl, arlalkenyl, etc., $R^3$ is selected from the group consisting of alkylene, cycloalkylene, arylene and mixtures thereof, such as alkylenecycloalkylene, alkylenearylene, etc., $R^4$ is selected from the group consisting of hydrogen, alkyl, alkenyl, cycloalkyl, cycloalkenyl, aryl and mixtures thereof, such as alkylaryl, alkylcycloalkyl, arylalkyl, alkenylaryl, alkenylcycloalkyl, arylcycloalkenyl, arylalkenyl, etc., $x$ is a positive integer of at least 1, $y$ is a positive integer of at least 1, and $z$ is a positive integer of at least 0.

Even more preferably, the fire-retardant additive, when employed in its monomeric form, is 2,2′,6,6′-tetramethyl-3,3′,5,5′-tetrabromo-1,1′-biphenol (hereinafter sometimes referred to as TTB) because of its ready commercial availability, its thermal stability, and the high percentage (58%) bromine contained by TTB relative to the molecular weight of TTB.

Preferably, the fire-retardant additive, when employed in its TATB derivative form, has a sufficiently high percentage by weight of bromine to provide the desired degree reduction in the flammability characteristic of a normally flammable resin without deleteriously affecting the desired physical and/or chemical properties, the appearance, or the toxicity of the resulting fire-retardant polymeric composition.

Especially preferred are fire-retardant monomeric additives of formula I set out hereinbefore which contain hydrocarbyl radicals of formulas (i) (a) through (i) (e) set out hereinbefore, wherein each $R^2$, $R^3$ and $R^4$ radical independently contains from about 1 to about 10 carbon atoms, each $x$, $y$ and $z$ are independently a positive integer of up to about 5.

Suitable methods for the preparation of TATB derivatives of formula (I) wherein $R^1$ substituents are selected from the group consisting of organic radicals are disclosed, which is hereby incorporated herein by reference, in our copending application, Ser. No. 450,334, filed, Mar. 12, 1974, assigned to the same assignee as the present invention.

A presently preferred class of halogenated polymeric organic compounds comprise polymeric skeletal structures containing a 2,2′,6,6′-tetraalkyl-3,3′,5,5′-tetrabromo-1,1′-biphenyldioxy unit of the formula:

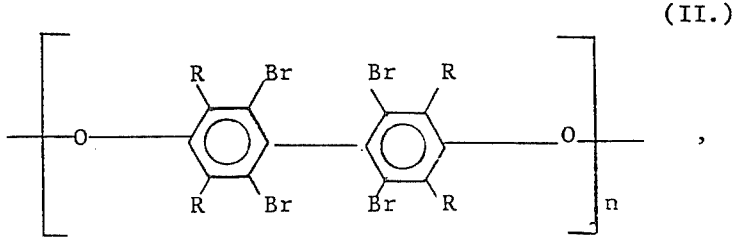

and a unit of the formula:

$$\left[\!\!\left[-A-\right]\!\!\right]_s \qquad (III)$$

wherein R and n are defined hereinbefore, A is a divalent organic radical, and $s$ is a positive integer of at least 1.

An especially preferred group of fire-retardant halogenated polymeric organic compounds are brominated polycarbonate resins having molecular units selected from the formulas:

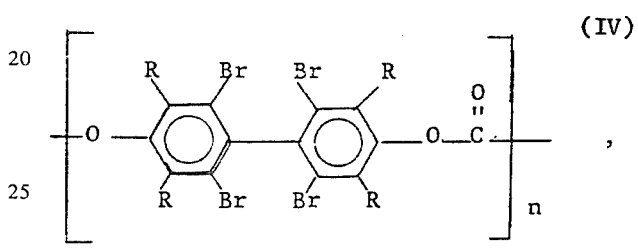

and

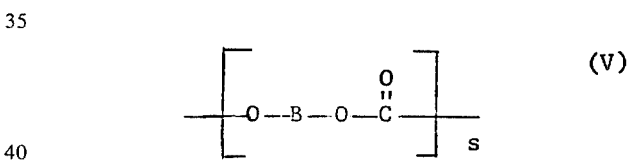

wherein R is as defined hereinbefore, B is a divalent alkylene, cycloalkylene, arylene radical or a mixture thereof, or a polyarylene radical interrupted by alkylene, cycloalkylene, oxygen-, nitrogen-, sulfur-, or phosphorus-containing groups, and n and s are both positive integers each being at least equal to 1. A particularly preferred member of the polycarbonate resins are halogenated aromatic polycarbonates wherein the polycarbonates comprise, in combination, a halogenated aromatic carbonate homopolymer in which the repeating units comprise units of formula IV, set out hereinbefore, wherein R is as defined hereinbefore, the average number of repeating units defined by $n$ being a positive integer of from about 2 to about 400, and an aromatic carbonate homopolymer in which the repeating units comprise units of the formula:

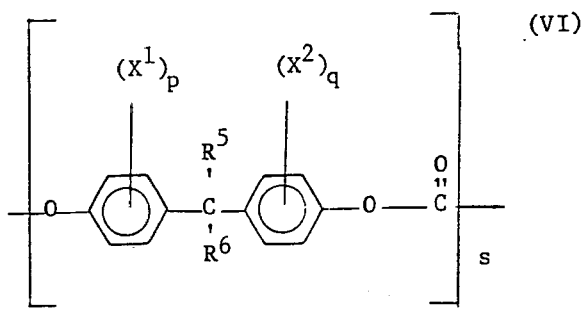

wherein $R^5$ and $R^6$ are hydrogen, lower alkyl or phenyl, $X^1$ and $X^2$ are hydrogen, lower alkyl or phenyl, $p$ and $q$ are positive integers of from 1 to 4, and the average number of repeating units defined by $s$ being a positive integer of from about 2 to about 400. Preferably, the halogenated polycarbonate will comprise component formula IV homopolymer recurring units wherein $n$ is a positive integer of from about 50 to about 200, and component formula V recurring units wherein $s$ is a positive integer of from about 50 to about 200. Among the brominated biphenols which are most useful in the preparation of the polycarbonate homopolymer substituents of component formula IV described hereinabove are brominated biphenols selected from 2,2',6,6'-tetramethyl-3,3',5,5'-tetrabromo-1,1'-biphenol (TTB), 2,2',6,6'-tetraethyl-3,3',5,5'-tetrabromo-1,1'-biphenol, 2,2',6,6'-tetra-n-propyl-3,3',5,5'-tetrabromo-1,1'-biphenol, 2,2',6,6'-tetra-n-butyl-3,3',5,5'-tetrabromo-1,1'-biphenol, and 2,2',6,6'-tetra-n-pentyl-3,3',5,5'-tetrabromo-1,1'-biphenol. Among the dihydric biphenols which are most useful in the preparation of the polycarbonate homopolymer substituents of component formula V described hereinabove are dihydric phenols selected from 2,2'-bis(1-hydroxyphenyl)propane (bisphenol-A); 2,2'-bis(1-hydroxyphenyl)butane; 1,1'-bis(hydroxyphenyl)methane; 2,2'-bis(1-hydroxyphenyl)pentane; 3,3'-bis(1-hydroxyphenyl)hexane; 1,1'-bis(1-hydroxypentyl)phenylmethane; and 1,1'-bis(1-hydroxyphenyl)cyclohexylmethane; etc. Especially suitable and preferred is the commercially available compound bisphenol-A. Suitable methods for the preparation of brominated polycarbonates are described in our copending application, Ser. No. 450,334, filed Mar. 12, 1975, previously referred to hereinbefore.

Another especially preferred group of fire-retardant halogenated polymeric organic compounds are brominated polyester resins having molecular units selected from the formulas:

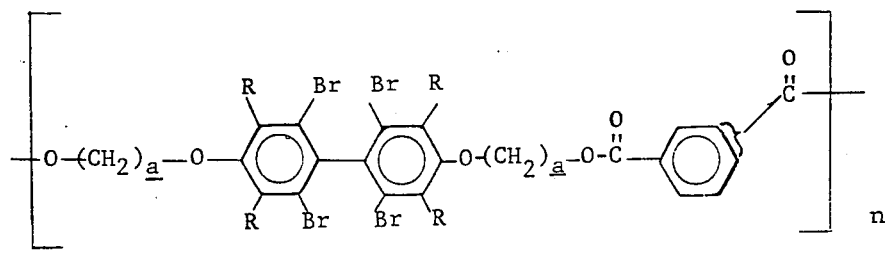

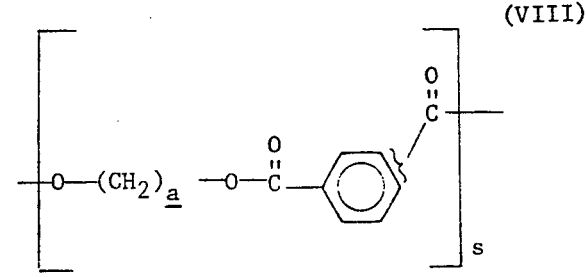

wherein $n$ and $s$ are the same as defined hereinbefore, and $a$ is a positive integer of from about 2 to about 4. Preferably, the halogenated polyesters comprise terephthalates or isophthalates of the above general formulas wherein $n$ and $s$ are positive integers of from about 2 to about 400, including copolyesters of terephthalic acid and up to about 35 mole percent of isophthalic acid and, if desired, up to about 15 percent of an aliphatic diacid.

The brominated biphenols which are most useful in the preparation of the polyester terephthalic or isophthalic esters molecular units of formula VII described hereinabove are brominated biphenols selected from 1,1'-bis(2-hydroxyethoxy)-2,2',6,6'-tetrabromo-3,3',5,5'-tetramethylbiphenyl, 1,1'-bis(2-hydroxypropoxy)-2,2',6,6'-tetrabromo-3,3',5,5'-tetramethylbiphenyl, and 1,1'-bis(2-hydroxybutoxy)-2,2',6,6'-tetrabromo-3,3',5,5'-tetramethylbiphenyl. Suitable methods for the preparation of brominated polyester resins are decribed in our copending application Ser. No. 450,334, filed Mar. 12, 1974, previously referred to hereinbefore.

Other halogenated polymers that can be prepared containing the fire retardant 2,2',6,6'-tetraalkyl-3,3',5,5'-tetrabromo-1,1'-biphenyldioxy molecular unit within their polymer skeletal structures, in addition to the especially preferred group of fire retardant halogenated polymeric organic compounds set out above which can be employed in the practice of this invention are described in our copending application Ser. No. 450,334, filed Mar. 12, 1974, referred to hereinbefore.

The terms "nonburning", "self-extinguishing" and "nondripping" are used, when employed herein and in the appended claims, to describe fire-retardant compositions which meet the standards of ASTM test method D-635 and Underwriters' Laboratories Bulletin No. 94. In the U.L. 94 test, a molded piece 5 in. by ½ in. by 1/16 in. is formed from the composition and if after each of two 10-second ignitions the sample will extinguish itself within an average of 25 seconds and within a maximum of 30 seconds — and if any dripping portions do not ignite a piece of cotton 12 inches beneath — the composition is deemed to be Self Extinguishing, Class 1 by the Underwriters' Laboratories. ASTM test D-635 for flammability comprises contacting the end of a specimen ½ in. by 5 in. and "thickness normally supplied" with a Bunsen burner flame for 30 seconds; and repeating if there is no ignition. If the specimen does ignite but does not continue burning to the 4 in. mark, after the flame is removed, it is classed as "self-extinguishing" by this test.

In general, for convenience, the term "fire-retardant", when employed herein and in the appended claims, is used in the sense that the resistance to combustibility of the composition is significantly increased in comparison with control samples. A suitable direct measure of combustibility is the Oxygen Index Test. This test is a direct measure of a product's combustibility based on the oxygen content of the combustion atmosphere. Appropriate specimens are placed in a combustion chimney and the oxygen is reduced stepwise until the material no longer supports a flame. The Oxygen Index is defined as the percent oxygen times 100 divided by the sum of the percentages of nitrogen and oxygen in the gas used to burn the material under test. Further details of the Oxygen Index test are found in ASTM test method D-2863. The compositions of this invention which contain fire-retardant additives of the specified types have a substantially higher oxygen index and thus are much less combustible than the controls.

In general, the amount of fire-retardant additive used is not critical so long as it is present in an effective, preferably minor, proportion based on the amount of the total polymeric composition — major proportions, generally, or often detract from physical properties of the composition — however, the amount of fire retardant additive employed should be an amount, preferably, at least sufficient to render the normally flammable resin nonburning, self-extinguishing or to increase the resins' oxygen index above the resins-oxygen index in the absence of the additive. Those skilled in the art are well aware that the amount will vary with the nature of the resin and with the efficiency of the additive. In general, however, the amount of additive will be from 0.5 to 50 parts by weight per hundred parts of resin. A preferred range will be from about 3 to 25 parts and an especially preferred range will be from about 5 to 15 parts of additive per 100 parts of resin. If synergists, e.g., antimony oxide, are used, they will be employed at about 2 to 5 parts by weight per 100 parts of resin.

The following examples illustrate the preparation of fire-retardant polymeric compositions which are within the scope of this invention. They are not to be construed, however, to limit the scope of our invention in any manner whatsoever. In the examples the following glossary of abbreviations is frequently employed for purposes of brevity, especially in the Tables associated with the Examples.

A = polyphenylene oxide — (PPO)
B = polystyrene — (PS)
C = polyethylene terephthalate (PET)
D = polybutylene terephthalate (PBT)
E = bis(hydroxyethoxy)tetrabromotetramethylbiphenyl
F = copolymer (BPA/TTB)
G = copolymer (BPA/TBBPA)
H = diallyloxytetrabromotetramethylbiphenyl (DATTB)
I = polyester
J = high impact polystyrene (HIPS)
K = medium impact polystyrene (MIPS)
L = hexabromobiphenyl (HBBP)
M = hexabromobenzene (HBB)
N = decabromobiphenyl (DBBP)
O = polypropylene (PP)
P = high heat high impact polystyrene (HHIPS)
Q = antimony oxide ($Sb_2O_3$)
R = bisphenol-A (BPA)
S = polyethylene (PE)
T = tetrabromotetramethylbiphenol (TTB)
U = tetrabromobisphenol-A (TBBPA)
W = triphenylphosphate
X = tetrabromo bisphenol-A polycarbonate

EXAMPLE 1

Polymer blends of polyphenylene oxide and polystyrene were evaluated both in the presence and in the absence of 2,2',6,6'-tetramethyl-3,3',5,5'-tetrabromo-1,1'-biphenol (TTB) as well as in the presence of other known effective fire retardant additives for these polymer blends. The polymer compositions contained other ingredients which are nonessential to the determination or the efficacy of the fire retardant properties of the compositions, such as minor amounts of processing additives, antioxidants, etc. The effect of the addition of a fire-retardant supplement, such as antimony oxide, to fire retardant polyphenylene oxide, polystyrene, TTB fire-retardant compositions was also evaluated. The characteristics of the fire-retardant compositions were evaluated in accordance with Underwriters' Laboratory Bulletin No. 94 and in accordance with the oxygen index test standards and procedures set out in ASTM test method D2863. A tabulated summary of the resin, fire-retardant additive, fire-retardant supplement, bromine content, burning characteristics, polymer properties and polymer processing conditions of the various polymer compositions tested are set out in Table I.

phenol-A polycarbonates, respectively, had powder I.V.'s (CHCl$_3$) — 0.417 dl./g., 0.367 dl./g.; % bromine — 22.9, 27.0; % hydroxyl — 0.024, 0.029; melt viscosity — 45,870, 15,610; and a Tg$_{TOA}$ — 209° C., 191° C.

The burning characteristics were determined out in accordance with the procedures referred to in Example 1.

EXAMPLE 1 - Table I

| RUN NUMBERS | | 1 | 2 | 3 | 4 |
|---|---|---|---|---|---|
| (a) | Resin Type | | | | |
| | 1. Ingredients-pbw | A-50 | same | same | same |
| | 2. Ingredients-pbw | B-50 | same | same | same |
| (b) | Fire Retardant Additive Type | | | | |
| | 1. Ingredients-pbw | none | W-3.0 | T-8.6 | T-8.6 |
| (c) | Fire Retardant Supplement | | | | |
| | 1. Ingredients-pbw | | | | Q-2.5 |
| (d) | Bromine Content Composition-% | none | none | 4.5 | 4.4 |
| (e) | Burning Characteristics | | | | |
| | 1. U.L. 94 | | V-1 | | V-1 |
| (f) | Polymer Properties | | | | |
| | 1. Tensile-yield, psi | | 8700 | 9450 | 8900 |
| | 2. Tensile Strength-ultimate, psi | | 8300 | 8600 | |
| | 3. Elongation, yield-% | | 66 | 62 | 45 |
| | 4. Izod Impact-ft.lbs/in. notch | | 4.8 | 4.0 | 3.1 |
| | 5. Heat Distortion Temperature-° F. | | 248 | 254 | |
| | 6. Gardner Impact-in.lb. | | 190 | 180 | |
| (g) | Polymer Processing Conditions | | | | |
| | 1. Extrusion temperature range-° F. | | 520–600° F | same | same |
| | 2. Molding temperature range-° F. | | 200° F | same | same |

The above data illustrates that polyphenylene oxide polystyrene polymeric materials have improved fire-retardancy when they contain TTB as a fire-retardant additive without deleteriously affecting the basic polymer properties associated with polyphenylene oxide polystyrene blends.

The results of the evaluation of the fire-retardant properties of the polyester compositions are set out in Runs 5 thru 10 in Table I hereafter:

EXAMPLE 2 - Table I

| RUN NUMBERS | | 5 | 6 | 7 | 8 | 9 | 10 |
|---|---|---|---|---|---|---|---|
| (a) | Resin Type | | | | | | |
| | 1. Ingredients-pbw | C-100 | C-100 | C-100 | D-100 | same | same |
| | 2. Ingredients-pbw | | F-20.5 | G-20.5 | | F-20.5 | G-20.5 |
| (b) | Fire Retardant Additive Type | | | | | | |
| | 1. Ingredients-pbw | | | | | | |
| (c) | Fire Retardant Supplement | | | | | | |
| | 1. Ingredients-pbw | | Q-7.5 | Q-7.5 | none | Q-7.5 | Q-7.5 |
| (d) | Bromine Content Composition-% | 6.0 | | | | | |
| (e) | Burning Characteristics | | | | | | |
| | 1. U.L. 94 | burns | V-0 | V-0 | burns | V-0 | V-0 |
| | 2. O.I. | 26.9 | 35.2 | 37.1 | 22.4 | 28.8 | 27.9 |
| (f) | Polymer Properties | | | | | | |
| | 1. Tensile-yield, psi | 8940 | 9450 | 9680 | 7990 | 7400 | 7830 |
| | 2. Tensile Strength-ultimate, psi | 5890 | 7020 | 5260 | 7260 | 7820 | 7980 |
| | 3. Elongation, yield-% | | | | 15 | 12 | 12 |
| | 4. Elongation, ultimate-% | 490 | 490 | 250 | 690 | 30 | ~55 |
| | 5. Flex Modulus-psi × 10$^5$ | 3.61 | 3.46 | 3.61 | 3.44 | 3.95 | 3.81 |
| (g) | Polymer Processing Conditions | | | | | | |
| | 1. Extrusion temperature range-° F | 270–290 | same | same | same | same | same |
| | 2. Molding temperature range-° F | 160–270 | same | same | same | same | same |

EXAMPLE 2

A series of runs were carried out evaluating the fire-retardant properties of polyethylene terephthalate resins and polybutylene terephthalate resins in the presence of TTB/bisphenol-A polycarbonate and tetrabromobisphenol-A/bisphenol-A polycarbonate fire retardant additives as well as in the absence of any flame retardant additive for control purposes. The polycarbonate TTB/bisphenol-A was prepared by the addition of molar equivalents of bisphenol-A bischloroformate in a solution of methylene chloride to a solution of TTB, aqueous sodium hydroxide, benzoyl triphenylphosphonium chloride and sodium hydrosulfite. The TBBPA/bisphenol-A polycarbonate was prepared by a similar procedure wherein TTBPA was substituted to TTB. The resulting TTB/bisphenol-A and TBBPA/bis- The above data illustrates that polyester compositions have improved fire-retardancy when they contain TTB polycarbonates as a fire-retardant additive without deleteriously affecting the basic properties associated with the polyester compositions.

EXAMPLE 3

Terephthalate polyesters of butanediol and 1,1'-bis(2-hydroxyethoxy)-2,2',6,6'-tetramethyl-3,3',5,5'-tetrabromobiphenyl and a terephthalate polyester of butanediol and tetrabromobisphenol-A were prepared. Each polyester was combined on a weight percentage basis accordingly: 69.6% polyester, 26.1% ⅛ in. glass fibers, 2.6% Sb$_2$O$_3$, 1.3% Cabosil EH-5, and 0.4% Irganox 1010 stabilizer.

Each of the polyester formulations was tested in accordance with the U.L. and O.I. test procedures set out in Example 1. The results of said tests are set out in Table I.

EXAMPLE 3 - Table I

| RUN NUMBERS | | 11 | 12 |
|---|---|---|---|
| (a) | Resin Type | | |
| | 1. Ingredients-pbw | D-86 | D-86 |
| | 2. Ingredients-pbw | E-14 | X-14 |
| (b) | Fire Retardant Supplement | | |
| | 1. Ingredients-pbw | Q-3.7 | Q-3.7 |
| (c) | Bromine Content Composition-% | 6.5 | 6.5 |
| (d) | Burning Characteristics | | |
| | 1. U.L. 94 | V-0 | V-0 |
| | 2. O.I. | 29.5 | 28.5 |
| (e) | Polymer Properties | | |
| | 1. Tensile Strength, ultimate-% | 16,900 | 19,500 |
| | 2. Flex Modulus-psi × $10^5$ | 10.3 | 12.7 |
| | 3. Percent Retained Tensile After | | |
| | Aging at 180° C. For Indicated Hrs. | | |
| | (168 hours) | 94% | 98% |
| | (336 hours) | 80% | 80% |
| | (744 hours) | 73% | 50% |
| | (1080 hours) | 56% | 39% |

The above data demonstrates fire-retardancy and the improved thermal stability of polyester formulations prepared from thermally stable TTB diol derivatives, Run No. 11, in contrast with polyester formulations prepared from other well-known commercially available TBBPA diols, Run No. 12.

EXAMPLE 4

A series of polystyrene/unsaturated polyester resin blends having the general proportions by weight, as set out in Table I hereafter, were combined with fire-retardant additives and fire-retardant supplements in order to determine the fire-retardant characteristics of polystyrene/unsaturated polyester polymer compositions when combined with TTB or DATTB. Tests were conducted both in the presence and in the absence of a fire-retardant supplement.

3.3 grams of a paste made up of a 50/50% by weight styrene and benzoylperoxide powder was thoroughly mixed into each 100 grams of polystyrene/unsaturated polyester resin blend. The mixtures were cast into an aluminum mold 5 in. × 10 in. × ¼ in. which had previously been heated to 70° Curing was accomplished in a forced air oven in two stages; 70° C. for 1.5 hours, and 100° C. for 1.5 hours. Samples ¼ in. × ⅛ in. × 5 in. were cut from the cured polystyrene/polyester castings and the O.I. values associated with the compositions were determined.

The results are summarized in Table I hereafter.

EXAMPLE 4 - Table I

| RUN NUMBERS | | 13 | 14 | 15 | 16 | 18 | 19 | 20 | 21 | 22 |
|---|---|---|---|---|---|---|---|---|---|---|
| (a) | Resin Type | | | | | | | | | |
| | 1. Ingredients-pbw | B-40 | B-36 | B-34 | B-34 | B-31 | B-39.0 | B-37.0 | B-37.0 | B-34 | B-39 |
| | 2. Ingredients-pbw | I-60 | I-54 | I-51 | I-51 | I-46.5 | I-58.5 | I-55.5 | I-55.5 | I-51 | I-58.5 |
| (b) | Fire Retardant Additives | | | | | | | | | |
| | 1. Ingredients-pbw | none | H-10 | H-15 | H-10 | H-15 | H-2.5 | H-7.5 | T-8.76 | T-6.56 | T-4.38 |
| (c) | Fire Retardant Supplement | | | | | | | | | |
| | 1. Ingredients-pbw | none | none | none | Q-5 | Q-7.5 | Q-1.25 | Q-3.75 | Q-5 | Q-3.75 | Q-2.5 |
| (d) | Burning Characteristics | | | | | | | | | |
| | 1. O.I. | 19.76 | 20.44 | 21.76 | 27.60 | 29.06 | 23.67 | 25.98 | 30.44 | 26.94 | 25.0 |

EXAMPLE 5

A series of runs were carried out combining a high impact polystyrene resin with either a TTB/bisphenol-A polycarbonate or a TBBPA/bisphenol-A polycarbonate fire-retardant additive. A high impact polystyrene resin free of any additive was run as a control. The results of the tests are set out in Table I in Runs 23 through 25.

EXAMPLE 5 - Table I

| RUN NUMBERS | | 23 | 24 | 25 |
|---|---|---|---|---|
| (a) | Resin Type | | | |
| | 1. Ingredients-pbw | J-100 | J-100 | J-100 |
| (b) | Fire Retardant Additives | | | |
| | 1. Ingredients-pbw | none | G-6.1 | F-6.1 |
| (b') | Fire Retardant Supplement | | | |
| | 1. Ingredients-pbw | none | Q-2.0 | Q-2.0 |
| (c) | Bromine Content Composition-% | none | 4.75 | 4.90 |
| (d) | Burning Characteristics | | | |
| | 1. U.L. 94 | burns | V-2 | V-2 |
| | 2. O.I. | 18.3 | 20.67 | 21.23 |
| (e) | Polymer Properties | | | |
| | 1. Tensile-yield, psi | 4423 | 4255 | 4574 |
| | 2. Tensile Strength-ultimate, psi | 4431 | 4248 | 4447 |
| | 3. Elongation, yield-% | 1.69 | 1.63 | 1.88 |
| | 4. Elongation, ultimate-% | 35.0 | 2.40 | 2.80 |
| | 5. Izod Impact-ft.lbs./in. notch | 1.82 | 0.77 | 0.40 |
| | 6. Heat Distortion Temperature-° F. | 173.3 | 185.0 | 180.5 |
| | 7. Gardner Impact-in.lb | | | 16.90 |
| | 8. Tan.Modulus-psi × $10^5$ | 3.52 | 3.41 | 3.74 |

FOOTNOTE: The TTB polycarbonates and the TBBPA polycarbonates employed in the high impact polystyrene compositions above were prepared in accordance with the procedure and have the physical properties described in Example 2.

The above data indicates that the TTB additives in combination with polystyrene can improve the burning characteristics of the polymeric compositions without deleteriously affecting the general physical properties of the polystyrene resin.

EXAMPLE 6

A series of medium impact polystyrene resins were evaluated as fire-retardant polymeric compositions both in the presence of tetrabromotetramethylbiphenol (TTB), as well as in the presence of known effective fire-retardant additives, i.e., hexabromobiphenyl (HBBP), decabromobiphenol (DBBP) and hexabromobenzene (HBB). A medium impact polystyrene resin free of any additives was used as a control.

The burning characteristics of the polymers were determined in accordance with procedures set out in Example 1, and the results are set out in Runs 26 through 30 in Table I hereafter.

the absence of either a flame retardant additive or a flame retardant supplement was evaluated as a control.

The results of the tests conducted in accordance with the procedures set out in Example 1 are as set out in the Table I in Runs Nos. 31–34 hereafter.

EXAMPLE 7 - Table I

| RUN NUMBERS | | 31 | 32 | 33 | 34 |
|---|---|---|---|---|---|
| (a) | Resin Type | | | | |
| | 1. Ingredients-pbw | P-100 | same | same | same |
| (b) | Fire Retardant Additive Type-pbw/% | | | | |
| | 1. Ingredients | | T-713 | T-12.9 | T-18.7 |
| (b¹) | Fire Retardant Supplement | | | | |
| | 1. Ingredients-pbw | | Q-2.4 | Q-4.3 | Q-6.2 |
| (c) | Bromine Content Composition-% | | 3.8 | 6.3 | 8.5 |
| (d) | Burning Characteristics | | | | |
| | *1. Pyrolytic Characteristics | | 21.2 | 23.5 | 26.1 |
| | 2. Burning Rate-in./mm. | 18.3 | | | |
| (e) | Polymer Properties | | | | |
| | 1. Tensile-yield, psi | 4472 | 4790 | 4968 | 4556 |
| | 2. Tensile Strength-ultimate, psi | 4676 | 4680 | 4654 | 4517 |
| | 3. Elongation, yield-% | 1.76 | 1.60 | 1.63 | 1.65 |
| | 4. Elongation, ultimate-% | 45.70 | | | |
| | 5. Izod Impact-ft.lbs./in. notch | | 1.36 | 1.35 | 1.10 |
| | 6. Heat Distortion Temperature-° F. | 176 | 172 | 171.5 | 176.0 |
| | 7. Gardner Impact-in.lb | | 16.5 | 12.7 | 5.0 |
| | 8. Tan.Modulus-psi × 10⁵ | 4.13 | 4.39 | 4.47 | 3.37 |
| | 9. 0.5% Secant Modulus-psi × 10⁵ | 4.13 | 4.39 | 4.47 | 3.37 |
| | 10. 1.0% Secant Modulus-psi × 10⁵ | 3.88 | 4.12 | 4.21 | 3.33 |
| (f) | Polymer Processing Conditions | | | | |
| | 1. Molding temperature range-° F. | | 130–135 | 130–135 | |

*The U.L. 94 burning characteristics were performed on samples which had been aged one week at 70° C. prior to testing.

The above data indicates that high impact polysty-

EXAMPLE 6 - Table I

| RUN NUMBERS | | 26 | 27 | 28 | 29 | 30 |
|---|---|---|---|---|---|---|
| (a) | Resin Type | | | | | |
| | 1. Ingredients-pbw | K-100 | same | same | same | same |
| (b) | Fire Retardant Additives-pbw | | | | | |
| | 1. Ingredients-pbw | none | T-6.4 | L-6.4 | M-6.4 | N-6.4 |
| (c) | Fire Retardant Supplement | | | | | |
| | 1. Ingredients-pbw | none | Q-3.2 | same | same | same |
| (d) | Bromine Content Composition-% | none | 6.4 | same | same | same |
| (e) | Burning Characteristics (1) | | | | | |
| | 1. Pyrolysis Characteristics | | S.E. | B | B | S.E. |
| | 2. Burning Rate-in./min. | 1.0 | 1.25 | 1.3 | 1.3 | 0.25 |
| (f) | Polymer Properties | | | | | |
| | 1. Tensile-yield, psi | 3800 | 3675 | 3625 | 3650 | 3700 |
| | 2. Tensile Strength-ultimate, psi | 3650 | 3475 | 3500 | 3275 | 3125 |
| | 3. Elongation, yield-% | 1.1 | 1.1 | 1.1 | 1.1 | 1.2 |
| | 4. Elongation, ultimate-% | 32.5 | 23.5 | 28.3 | 17.0 | 4.9 |
| | 5. Flex Modulus psi × 10⁵ | 3.97 | 4.06 | | | |
| | 6. Heat Distortion Temperature-° F. | 160 | 162 | 158 | 158 | 162 |
| | 7. Tan.Modulus-psi × 10⁵ | 4.11 | 4.22 | 3.97 | 4.16 | 4.28 |
| | 8. Flexural Strength, psi | 7650 | 7850 | 7800 | 7850 | 7650 |
| | 9. 0.5% Secant Modulus-psi × 10⁵ | 4.11 | 4.21 | 3.97 | 4.05 | 4.23 |
| | 10. 1.0% Secant Modulus-psi × 10⁵ | 3.61 | 3.62 | 3.56 | 3.59 | 3.60 |

(S.E. = self-extinguishing)
(B. = burning)
(1) = Solid flexural specimens ½" × ⅛" × 6" prepared by injection molding were employed in the burn rate test procedures.

The above data illustrates that medium impact polystyrene resins containing TTB have improved flame-retardant polymeric properties without deleteriously affecting the general physical properties of the polymer.

As illustrated by the numbers 28 and 29, TTB additives are as effective or more effective than other commercially available fire-retardant halogenated organic materials when TTB is employed as flame retardants for polystyrene resins.

EXAMPLE 7

A series of runs were carried out evaluating the efficacy of TTB as a flame retardant additive for high impact polystyrene resins. A high impact polystyrene in rene resins containing the thermally stable halogenated organic TTB have improved fire retardant properties as determined by U.L. 94 and oxygen text procedures, without deleteriously affecting the high impact polystyrene resin properties.

EXAMPLE 8

A series of runs were carried out to evaluate the effect of TTB additives as a fire-retardant for polyethylene and polypropylene resin types. Polyethylene and polypropylene compositions free of any additives were evaluated for control purposes. The tests were carried out in accordance with the procedures set out in Example 1 and the results thereof are set out in Table I hereafter.

EXAMPLE 8 - Table I

| RUN NUMBERS | | 35 | 36 | 37 | 38 | 39 | 40 | 41 | 42 |
|---|---|---|---|---|---|---|---|---|---|
| (a) | Resin Type | * | * | * | * | * | ** | ** | ** |
|  | 1. Ingredients-pbw | S-100 | S-80 | S-80 | S-86.7 | S-93.3 | O-100 | O-100 | O-100 |
| (b) | Fire Retardant Additive Type | | | | | | | | |
|  | 1. Ingredients-pbw | none | T-20 | T-15 | T-10 | T-5 | 0 | T-20 | T-15 |
| (c) | Fire Retardant Supplement | | | | | | | | |
|  | 1. Ingredients-pbw | none | none | Q-5 | Q-3.3 | Q-1.7 | 0 | Q-0 | Q-5 |
| (d) | Burning Characteristics | | | | | | | | |
|  | 1. U.L. 94 | burns | burns | SE | SE | burns | burns | burns | burns |
|  | 2. O.I. | 17.6 | 22.7 | 27.4 | 26.5 | 25.0 | 17.6 | 22.7 | 27.4 |
| (e) | Polymer Properties | | | | | | | | |
|  | 1. Tensile, yield-% | | | | | | | | |
|  | 2. Flexual Test Strength-psi | 3020 | | 3610 | | | 5800 | | 5860 |
|  | 3. Elastic Modulus-psi × $10^5$ | 1.10 | | 1.50 | | | 1.91 | | 2.34 |
|  | 4. 1.0% Secant Modulus-psi × $10^5$ | ~0.95 | | 1.23 | | | 1.81 | | 2.12 |

* Phillips polyethylene 5012
**Hercules 7501 polypropylene

The above results illustrate that the flame-retardant properties of polyolefin compositions are improved by the addition to the polyolefin composition of the essential fire-retardant additive TTB. The efficacy of TTB in meeting the Underwriters' Laboratories Test Standard 94 is enhanced by the addition of the fire retardant supplement, such as antimony oxide to the polyolefin compositions, as illustrated by the above data.

The fire-retardant polymeric compositions of this invention are substantially resistant to the burning process which consists essentially of at least a 3-stage process: i.e., heating of the polymeric composition, decomposition or pyrolysis of the polymeric composition, and ignition thereof as the temperatures increase and the flammable gases reach an appropriate ratio to the oxygen of the air. In addition, the flame retardant polymeric materials of this invention are substantially resistant to thermal degradation at the elevated temperatures associated with the aforementioned burning process. Accordingly, these flame retardant polymeric compositions may be used to prepare improved articles of manufacture having improved thermal and flame retardant stability. These polymers may be employed either alone or in combination with other resins using conventional manufacturing techniques such as molding, vacuum forming, extrusion, etc., in the manufacture of articles having improved fire retardancy and thermal stability at elevated temperatures.

It is also regarded to be among the features of this invention to include in the compositions, other ingredients, such as other fire-retardants, fillers, reinforcing agents, mold release agents, processing agents, pigments, stabilizers, antioxidants, ultraviolet light absorbers, nucleating agents, curing agents, etc., in conventional amounts for their conventionally employed purposes.

The manner of adding the flame retardant additives to the resin is not critical; is conventional; and will be obvious to those skilled in the art.

The flame-retardant polymer compositions of this invention are particularly well suited for applications requiring excellent fire-retardant properties and excellent color stability wherein articles of manufacture which include such items as television cabinets, microwave insulation, transformer housings, etc., among many others. Obviously, other modifications and variations of the present invention are possible in light of the above teachings. It is, therefore, understood that changes may be made in the particular embodiment of our invention described herein which embodiments are understood to be within the full intended scope of our invention as defined by the appended claims.

What we claim as new and desire to secure by Letters Patent in the United States is:

1. A fire-retardant polymeric composition comprising
   a. a normally flammable polystyrene resin, and
   b. a fire-retardant additive selected from halogenated monomeric and polymeric organic compounds of the formula:

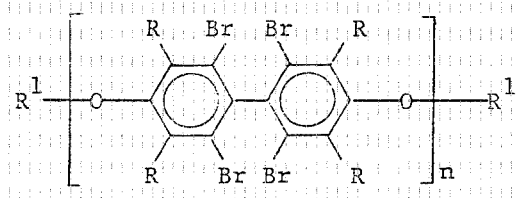

wherein each R independently is selected from primary alkyl groups, each $R^1$ independently is selected from hydrogen, or organic radicals, and $n$ is a positive integer of at least 1.

2. A composition in accordance with claim 1(b), wherein the additive is a fire-retardant polymeric composition containing a unit of the formula:

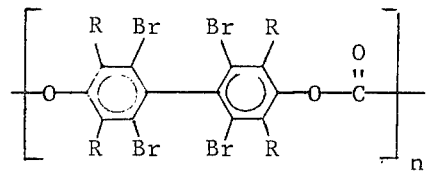

wherein R is a primary alkyl group, $n$ is a positive integer of at least 1, and a unit of the formula:

wherein A is a divalent organic radical, and $s$ is a positive integer of at least 1.

3. The composition in accordance with claim 1(b), wherein the additive is a fire-retardant polymeric composition containing a unit of the formula:

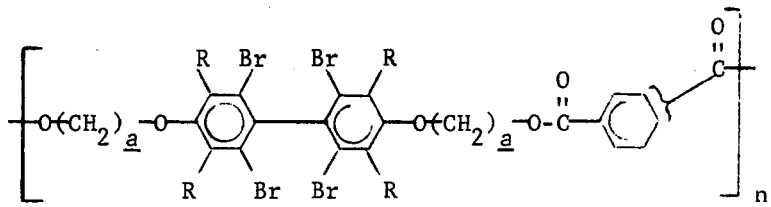

wherein R is as defined hereinbefore, $n$ is a positive integer of from about 2 to about 400, and $a$ is a positive integer of from about 2 to about 4, and a unit of the formula:

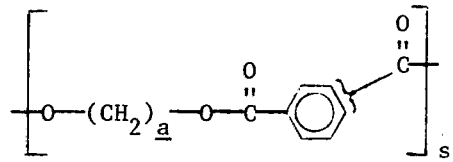

wherein $s$ is a positive integer of from about 2 to about 400 and $a$ is defined hereinbefore.

4. A composition in accordance with claim 3(b), wherein each R is independently selected from the group consisting of primary alkyl groups containing from about 1 to about 10 carbon atoms.

5. A composition in accordance with claim 3, wherein each R is methyl.

6. A fire-retardant polymeric composition comprising:
 a. a normally flammable polystyrene resin, and
 b. a fire-retardant additive selected from halogenated monomeric and polymeric organic compounds of the formula:

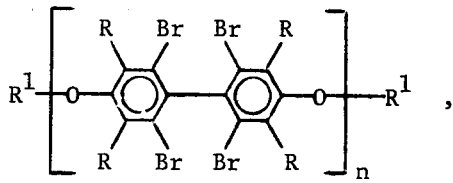

wherein each R independently is selected from primary alkyl groups, each $R^1$ independently is hydrogen.

7. A composition in accordance with claim 6, wherein each R is independently selected from the group consisting of primary alkyl groups containing from about 1 to about 10 carbon atoms.

8. A composition in accordance with claim 6, wherein each R is methyl.

9. A composition in accordance with claim 1(b), wherein the additive is a fire-retardant polymeric composition containing a unit of the formula:

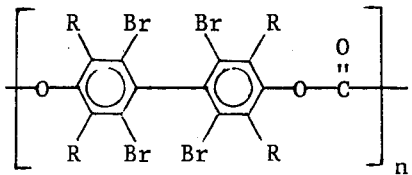

wherein R is a primary alkyl group, $n$ is a positive integer of at least 1.

10. A composition in accordance with claim 6(a), wherein the styrene resin is high impact polystyrene.

11. A composition in accordance with claim 6, comprising from about 0.5 to about 50 parts of said additive and from about 2 to about 5 parts of antimony oxide per 100 parts of said resin on a weight basis.

* * * * *